US007334067B2

(12) United States Patent
Brown et al.

(10) Patent No.: US 7,334,067 B2
(45) Date of Patent: Feb. 19, 2008

(54) PROGRAMMABLE CONTROLLER HAVING REDUCED CONTROL KEY SET

(75) Inventors: Paul Anson Brown, Sunnyvale, CA (US); Aaron Daniel Thieme, San Francisco, CA (US)

(73) Assignee: SP Controls, Inc., San Francisco, CA (US)

( * ) Notice: Subject to any disclaimer, the term of this patent is extended or adjusted under 35 U.S.C. 154(b) by 469 days.

(21) Appl. No.: 10/859,851

(22) Filed: Jun. 3, 2004

(65) Prior Publication Data

US 2006/0028236 A1 Feb. 9, 2006

(51) Int. Cl.
*G06F 13/12* (2006.01)

(52) U.S. Cl. .......... 710/67; 710/5

(58) Field of Classification Search .......... 710/2, 710/5, 67

See application file for complete search history.

(56) References Cited

U.S. PATENT DOCUMENTS

| | | | | |
|---|---|---|---|---|
| 5,859,623 | A * | 1/1999 | Meyn et al. | 715/730 |
| 6,064,668 | A | 5/2000 | Brown | 370/357 |
| 6,137,794 | A | 10/2000 | Brown | 370/360 |
| 6,140,987 | A | 10/2000 | Stein et al. | 345/87 |

OTHER PUBLICATIONS

Xantech Corporation, "Installation Instructions for Smartpad$_3$ Programmable Keypad System," Feb. 29, 2000 (downloaded from www.xantech.com/products/i_folder/i_smrtp3.pdf on Mar. 25, 2004), pp. 1-28.

Niles Audio Corporation, "IntelliPad Wall Mounted Programmable IR Keypad System," 1999 (downloaded from www.nilesaudio.com/pdffiles/manuals/intellipad.pdf on Mar. 25, 2004, 31 pages.

SP Controls, Inc., "SP3-TCM+ Transport Control Module," 2004, 23 pages.

(Continued)

*Primary Examiner*—Kim Huynh
*Assistant Examiner*—Eron Sorrell
(74) *Attorney, Agent, or Firm*—Girard & Equitz LLP

(57) ABSTRACT

In some embodiments, a wall-mountable, programmable controller having control keys (e.g., less than eight keys or another small number of keys), a subassembly including circuitry, and a control key insert removably mountable to the subassembly and including at least one of the control keys. The controller can have first and second key sets in distinct regions of the controller's surface and programmable switches that are actuatable by pressing control keys in the key sets. At least one switch actuatable by pressing a key of the first key set is programmed to perform a control operation of a first type (e.g., a power control operation), at least one switch actuatable by pressing a key of the second key set is programmed to perform a control operation of a second type (e.g., a source selection operation), no switch actuatable by pressing a key of the first key set is programmed to perform a control operation of the second type, and no switch actuatable by pressing a key of the second key set is programmed to perform a control operation of the first type. In some embodiments, the controller is configured to control a projector.

25 Claims, 8 Drawing Sheets

OTHER PUBLICATIONS

Crestron, "Crestron C2N-DB6/8/12 Decorator Wall Panels Operations & Installation Guide," downloaded from www.crestron.com/downloads/pdf/product_manuals/c2n-db6_c2n-db8_c2n-db12.pdf on Mar. 24, 2004, 5 pages.
Crestron, "Crestron CNWM-LT9 LiteTouch Keypad Operations & Installation Guide," downloaded from www.creston.com/downloads/pdf/product_manuals/cnwm-lt9.pdf on Mar. 24, 2004, 12 pages.
Xantech Corporation, "MRC44 Four Zone—Four Source Audio/Video Controller/Amplifier System," 2002, 6 pages.
Parts Express Product Catalog, including description of "NuVo™ Keypad Controller," 2004, front cover and p. 6.
Extron Electronics, "Control Modules—User's Manual", 2002, 15 pages.
Speakercraft, "The Book . . . Solutions for Custom Installers," Jun. 2004, front and back cover, pp. 68-69, and pp. 71-72.
iAutomate.com, "*Channel Plus MCS-1 Room Stereo Controller*", 2 pages, downloaded from the Internet on Jul. 28, 2005 from http://www.lautomate.com/mcs1.html.
iAutomate.com, "*Channel Plus MCS-2 Room Stereo Controller*", 2 pages, downloaded from the Internet on Jul. 28, 2005 from http://www.iautomate.com/mcs2.html.
Multiplex Technology, Inc., "*ChannelPlus Models MCS-1 and MCS-2 Single and Double Gang Music Controllers*", Aug. 30, 2001, 1 page, downloaded from the Internet (from http://www.firecontrolinc.com/downloads/mcs1-2_spec.pdf).
Multiplex Technology, Inc., "*ChannelPlus MDS-6 Installation Manual*", 15 pages, downloaded from the Internet on Jul. 28, 2005, from http://www.firecontrolinc.com/downloads/mds6_manual.pdf.
Multiplex Technology, Inc., "*ChannelPlus MDS-6 Owner's Manual*", 6 pages, downloaded from the Internet on Jul. 28, 2005, from http://www.firecontrolinc.com/downloads/mds6_manual.pdf.

* cited by examiner

PROGRAMMABLE CONTROLLER HAVING REDUCED CONTROL KEY SET

FIELD OF THE INVENTION

The invention pertains to a programmable apparatus for controlling a projector or other device (e.g., an audio, video, or audiovisual device) and to methods for programming and operating such an apparatus. In some embodiments, the invention is a wall-mountable projector controller having a first key set, a second key set, and programmable switches actuatable by pressing control keys in the key sets. Each key set includes at least one but no more than a small number of control keys, and the key sets are in distinct regions of the controller's surface. Each programmable switch actuatable by pressing a key of the first key set is programmed only to perform control operations of a first type (e.g., power control operations), and each switch actuatable by pressing a key of the second key set is programmed only to perform control operations of another type (e.g., volume control operations).

BACKGROUND OF THE INVENTION

The expression "controller" is used herein to denote a device configured to generate control signals for controlling a remotely located device (a "target"). Typically, the controller and target are connected by a wire pair or electrically conductive cable which terminates at an infrared (IR) emitter positioned near the target (or, in some cases, by a cable including an optical fiber or bundle of optical fibers), and the control signals propagate from the controller to the target (or to an IR emitter positioned near the target) over the wire pair or cable. For example, electrical control signals propagate over a wire pair from the controller to an IR emitter positioned near the target and IR control signals generated in the IR emitter in response to the electrical control signals propagate to the target. Alternatively, the controller and target are not connected by any wire pair or cable, and the control signals are transmitted (typically as electromagnetic radiation) from controller to target.

The expression "wall-mounted" device herein denotes a device that is mounted on or to a wall (e.g., in an electrical box affixed to a wall) or other object that is fixed during use of the device (e.g., a podium) and is designed to remain so mounted when in use. The expression "wall-mountable" device herein denotes a device that can be mounted on or to a wall or other object (e.g., a podium) that is to remain fixed during use of the device, and is designed to remain so mounted when in use.

Many types of handheld and wall-mounted controllers have been employed to control projectors, audio and video devices, and other devices. Typically, controllers have a large number of control keys (which are often quite small) and thus require that the user devote significant effort and attention to operating them. Some conventional controllers can be programmed (e.g., are operable in a learning mode in which they can be programmed) to execute specific programmed operations in response to user actuation of specific ones of their keys. However, a user must devote significant effort and attention to operating a conventional programmed controller of the type having a large number of keys from which the user must select.

Controllers having a small number of keys (e.g., less than eight keys) can be operated with less effort and attention from a user than controllers having more keys, since the user can more easily identify (and remember the location of) a desired key that belongs to a small set of keys than a desired key that belongs to a large set of keys. It is also desirable to reduce the number of control keys of a controller to reduce manufacturing cost. A programmable controller having a small number of control keys can be less expensive to manufacture than a nonprogrammable (or programmable) controller having a greater number of control keys.

However, a user must also devote significant effort and attention to operating conventional, wall-mounted, programmable controllers that have a small number of control keys. This is true for the following reasons. On such a controller, the programmed key for executing any specific operation can be located anywhere. Since the controller's face is not partitioned into regions allocated to control functions of specific, predetermined types, the user must learn (e.g., by inspecting a label) the control operation that each key has been programmed to execute. Typically, the keys of a conventional, wall-mounted, programmable controller are labeled after the controller is programmed to indicate to the user the control operation associated with each programmed key. Even with the keys so labeled, a user typically must study all or a large part of the controller's face to locate a desired key because the key could be located anywhere on the face.

There is a need for a programmable, wall-mounted controller having a small number of keys (i.e., less than eight keys), and which can be operated by a user with less effort and attention than required for operation of conventional, programmable, controllers.

SUMMARY OF THE INVENTION

In some embodiments, the invention is a wall-mountable, programmable controller having a small number of control keys (e.g., less than eight control keys). The controller has a first key set and a second key set (and optionally also at least one other key set). Each key set includes at least one of the control keys, and the key sets are in distinct regions of the controller's surface. Preferably, each key of the first key set is labeled to indicate that said key can be actuated to perform (e.g., to trigger execution of) a control operation of a first type (e.g., a power control operation), and each key of the second key set is labeled to indicate that said key can be actuated to perform (e.g., to trigger execution of) a control operation of a second type (e.g., a source selection or volume control operation). The controller also has programmable circuitry, including switches that are actuatable in response to actuation (e.g., pressing) of keys of the first key set and the second key set. The circuitry is programmed to perform at least one control operation of a first type in response to actuation of a key of the first key set, and to perform at least one control operation of a second type in response to actuation of a key of the second key set. The circuitry is not (and is not configured to be) programmed to perform a control operation of the second type in response to actuation of any key of the first key set, and is not (and is not configured to be) programmed to perform a control operation of the first type in response to actuation of any key of the second key set. Preferably, the controller is modular in the sense that it can be used with interchangeable, removably mountable control key inserts. Each insert having a key for triggering execution of a control operation of the first type is configured (i.e., sized and shaped) to be removably mounted to a first region of the controller's surface but preferably is configured not to be mountable to a second region (distinct from the first region) of the surface, and each insert having a key for triggering execution of a control operation of the second type is configured to be removably mounted to the second region of the surface but preferably is configured not to be mountable to the first region of the surface. Thus, each insert having at least one key for triggering execution of a "control operation of the first type" can be swapped for an insert having a different key (or keys) for triggering execution of a control operation of the first type. For example, if the control operation of the first type is a power control operation, an insert including a single power control key (which, when mounted can be depressed once to change the target's power state, either from "power on" to "power off" or from "power off" to "power on") can be swapped for another insert including two separate power control keys (one which, when mounted can be depressed to change the target's power state from "on" to "off;" and another which, when mounted can be depressed to change the target's power state from "off" to "on"). The controller will typically need to be reprogrammed each time one control key insert is swapped for another.

In some embodiments, the control keys of the inventive controller are transparent or translucent, the switches are mounted under the control keys, and illumination elements (e.g., LEDs) positioned near the switches are controlled to illuminate (i.e., backlight) each of the control keys that overlies a programmed switch. The illumination elements are controlled so that they do not illuminate any control key that does not overlie a programmed switch. This allows the user to determine at a glance which keys have not been programmed (e.g., which keys overlie only unprogrammed switches) and are thus not available for use.

In some embodiments, the invention is a wall-mountable, programmable controller having N control keys (where N is an integer in the range $2 \leqq N \leqq 6$) and a surface, wherein the surface has a first region including a first key set (including at least one control key), a second region (distinct from the first region) including a second key set (including at least one control key), and a third region (distinct from each of the first region and the second region) including a third key set (including at least one control key). A first programmable switch set (including at least one programmable switch) is positioned relative to the first key set and configured such that at least one switch in the first programmable switch set is actuated by pressing each control key in the first key set (e.g., the first programmable switch set underlies the first control key set), a second programmable switch set (including at least one programmable switch) is positioned relative to the second key set and configured such that at least one switch in the second programmable switch set is actuated by pressing each control key in the second key set (e.g., the second programmable switch set underlies the second control key set), and a third programmable switch set (including at least one programmable switch) is positioned relative to the third key set and configured such that at least one switch in the third programmable switch set is actuated by pressing each control key in the third key set (e.g., the third programmable switch set underlies the third key set). Each switch in the first programmable switch set is dedicated to control operations of a first type (e.g., power control operations) in the sense that the controller is programmed to perform operations (e.g., to trigger execution of operations) of the first type in response to actuation of any number of switches of the first programmable switch set (and preferably the switches of the first programmable switch set can be programmed to perform any of at least two different operations of the first type), each switch in the second programmable switch set is dedicated to control operations of a second type (e.g., source selection operations) in the sense that the controller is programmed to perform operations (e.g., to trigger execution of operations) of the second type in response to actuation of any number of switches of the second programmable switch set (and preferably the switches of the second programmable switch set can be programmed to perform any of at least two different operations of the second type), and each switch in the third programmable switch set is dedicated to control operations of a third type (e.g., volume control operations) in the sense that the controller is programmed to perform operations (e.g., to trigger execution of operations) of the third type in response to actuation of any number of switches of the third programmable switch set (and preferably the switches of the third programmable switch set can be programmed to perform any of at least two different operations of the third type). In some preferred embodiments, the second region is between the first and third regions. Preferably, each key of the first key set is labeled to indicate that said key can be actuated to trigger execution of a control operation of the first type, each key of the second key set is labeled to indicate that said key can be actuated to trigger execution of a control operation of the second type, and each key of the third key set is labeled to indicate that said key can be actuated to trigger execution of a control operation of the third type. Preferably, the controller is modular (in the sense that it can be used with interchangeable, removably mountable control key inserts), each insert having a key for triggering execution of a control operation of the first type is configured to be removably mounted to the first region of the controller's surface but preferably is configured not to be mountable to the second region or the third region, each insert having a key for triggering execution of a control operation of the second type is configured to be removably mounted to the second region of the surface but preferably is configured not to be mountable to the first region or the third region, and each insert having a key for triggering execution of a control operation of the third type is configured to be removably mounted to the third region of the surface but preferably is configured not to be mountable to the first region or the second region.

In some embodiments, the inventive controller has programmable circuitry (including switches and typically also a microprocessor), an infrared ("IR") receiver coupled to the circuitry and configured to assert programming bits to the circuitry in response to IR radiation (e.g., modulated IR radiation). In response to the programming bits, the circuitry programs appropriate ones of the switches. Preferably, the controller also includes an IR emitter output from which target control signals (e.g., for use in generating modulated IR target control radiation) can be asserted to the target (the projector or other device to be controlled) in response to control bits asserted to the IR emitter output by the circuitry. Typically, the target operates in response to target control radiation. Typically the target control signals propagate from the IR emitter output to an IR emitter (near the target) via a wire pair, and modulated target control IR radiation generated in the IR emitter in response to the target control signal is transmitted from the IR emitter to the target. In some embodiments including such an IR receiver and IR emitter output, the controller also includes an IR transmitter coupled to the circuitry and configured to transmit IR programming radiation (e.g., IR radiation modulated with programming bits for programming another controller) in response to programming bits received from the circuitry. A controller (a "first" controller) including such an IR transmitter is preferably operable in a cloning mode after it has been programmed. In the cloning mode, the first controller can cause learned data bits to be copied to a second controller (e.g., one identical to the first controller) to configure the second controller to emulate the programmed first controller.

In typical embodiments, the inventive controller is configured to control a projector, and can be programmed to do so in any of a number of different ways.

Another aspect of the invention is a control key insert that is removably mountable as an element of a modular controller. For example, the insert can include a body having a first set of alignment posts that are distinctively shaped and positioned for insertion in corresponding set of holes in a first region of a plate of the controller. Such an insert can be swapped for another whose body has an identical set of alignment posts. Preferably, a second region of the plate (distinct from the first region) has a second set of holes for receiving a second set of alignment posts (differently shaped and/or positioned relative to each other than the first set of alignment posts), so that an insert of a different type (having posts identical to the second set of alignment posts) can be removably mounted to the second region of the plate with its alignment posts in the second set of holes. Preferably, three (or two or four) of the inventive inserts (each preferably having a different, distinctive set of alignment posts) are sized and shaped to be aligned by a bezel, and the bezel is configured to be removably mounted to an embodiment of the inventive controller to retain the inserts in proper positions relative to the controller's switches (with the alignment posts received in holes of a plate of the controller).

In another class of embodiments, the inventive controller is a modular, wall-mountable, programmable controller to which at least one of the inventive control key inserts is removably mounted. Such a controller is modular in the sense that it can be used with any of a set of interchangeable, removably mountable control key inserts. For example, one insert including a single power control key (which can be depressed once to change the target's power state, either from "power on" to "power off" or from "power off" to "power on") can be swapped for another insert including two separate power control keys (one which can be depressed to change the target's power state from "on" to "off;" and another which can be depressed to change the target's power state from "off" to "on"). The controller will typically need to be reprogrammed each time one control key insert is swapped for another.

In some embodiments, the invention is a wall-mountable, programmable projector controller having N control keys, where $2 \leqq N \leqq 6$. The controller has a first key set, a second key set, and optionally a third key set. The key sets are in distinct regions of the controller's surface. The first key set includes one or two keys, each labeled to indicate that is can be actuated to perform (e.g., to trigger execution of) a projector power control operation. The second key set includes one or two keys, each labeled to indicate that it can be actuated to perform (e.g., to trigger execution of) a source selection operation. When present, the third key set includes one or two keys, each labeled to indicate that it can be actuated to perform a projector volume control operation. The controller also has programmable circuitry, including switches that are actuatable in response to actuation of keys of each key set. The circuitry is programmed to perform a projector power control operation in response to each actuation of a key of the first key set, to perform a source selection operation in response each actuation of a key of the second key set, and (if the third key set is present) to perform a projector volume control operation in response to each actuation of a key of the third key set. The circuitry is not (and is not configured to be) programmed to perform a source selection or projector volume control operation in response to actuation of any key of the first key set, and is not (and is not configured to be) programmed to perform a projector power or projector volume control operation in response to actuation of any key of the second key set. Preferably, the controller is modular in the sense that it can be used with interchangeable, removably mountable control key inserts. Each insert having a key for triggering execution of a projector power control operation is configured (i.e., sized and shaped) to be removably mounted to a first region of the controller's surface but not to be mountable to a second region (distinct from the first region) of the surface, and each insert having a key for triggering execution of a source selection operation is configured to be removably mounted to the second region of the surface but not to be mountable to the first region of the surface. Each insert having a key for triggering execution of a control operation of one type can be swapped for an insert having a different key (or keys) for triggering execution of a control operation of the same type. For example, an insert including a single power control key (which, when mounted can be depressed once to change a projector's power state, either from "power on" to "power off" or from "power off" to "power on") can be swapped for another insert including two separate power control keys (one which, when mounted can be depressed to change the projector's power state from "on" to "off;" and another which, when mounted can be depressed to change the projector's power state from "off" to "on"). The controller will typically need to be reprogrammed each time one control key insert is swapped for another. Other aspects of the invention are methods for programming and operating any embodiment of the inventive controller.

DETAILED DESCRIPTION OF PREFERRED EMBODIMENTS

Figure 1:
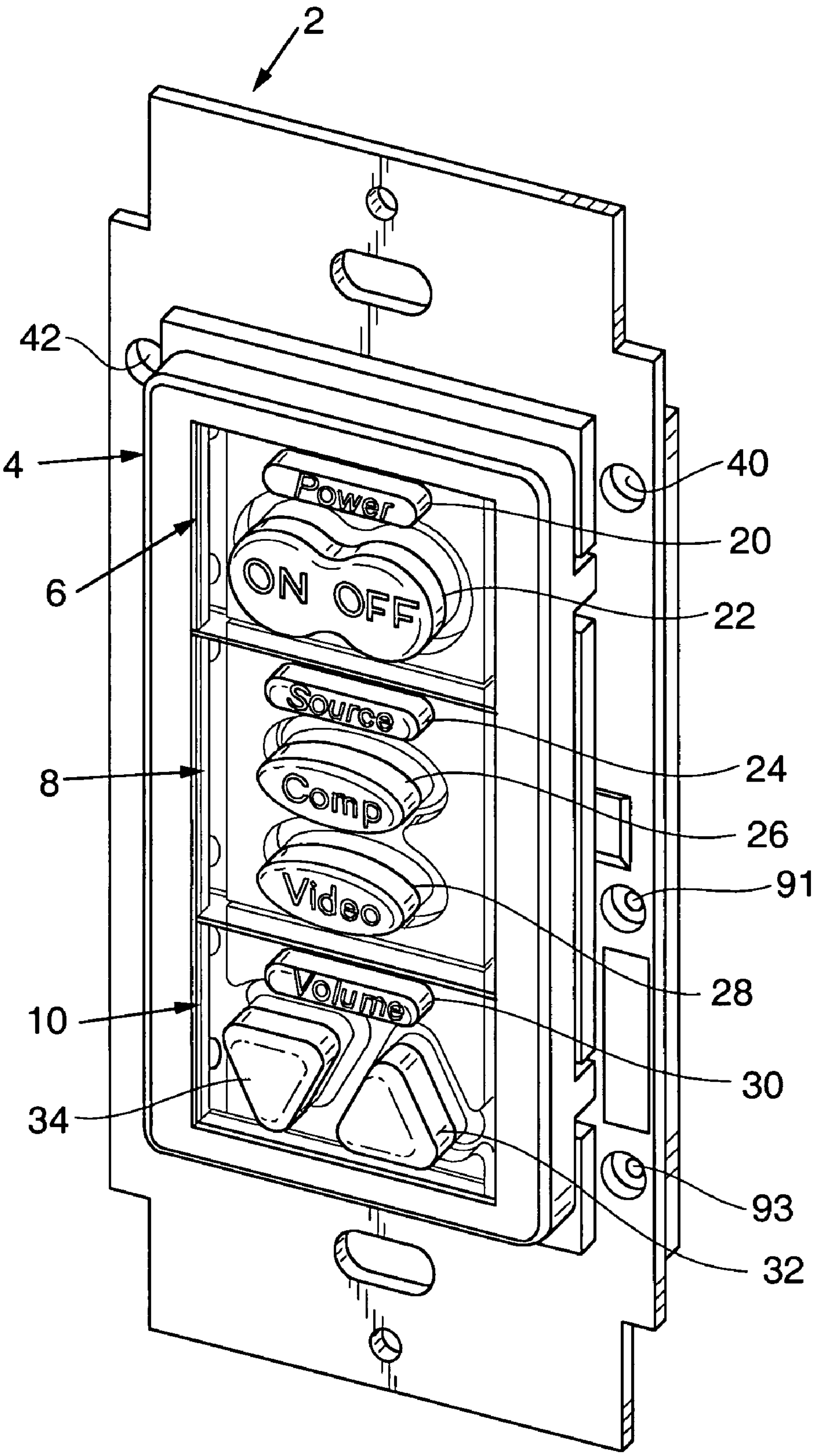
FIG. 1 is a perspective view of the front side of an embodiment of the inventive controller.

A wall-mountable embodiment of the inventive controller will be described with reference to FIGS. 1-8. As shown in FIGS. 1 and 3, this controller includes metal back plate 2 which is configured to be mounted by screws (not shown) in an electrical box in a wall. Printed circuit board ("PCB") 12 is mounted to the back side of plate 2 with insulation plate 14 (shown in FIG. 8 but not visible in FIGS. 1 and 3) positioned between PCB 12 and back plate 2 to electrically insulate PCB 12 from plate 2. Circuit elements (to be described below) of the controller are surface mounted to PCB 12. These circuit elements include programmable microprocessor 80, crystal oscillator 81 (or another clock signal generation element) for use in generating a clock signal for use by microprocessor 80, EEPROM 82 (or another memory) preloaded with data and executable code for use by microprocessor 80, light-emitting diodes (LEDs) 83-91 (controlled by microprocessor 80), pressure-sensitive switches 60-77, and infrared receiver 40 (for asserting control bits to microprocessor 80 in response to received infrared radiation), infrared transmitter 42 (for transmitting modulated infrared radiation in response to control bits asserted by microprocessor 80, for purposes to be explained below), and connector unit 92. In a typical implementation, each of switches 60-77 is pressure-sensitive in the sense that a portion thereof is configured to move in response to pressure exerted thereon (by a control key that has moved into engagement with the switch in response to user actuation) to a switch-closed position (in which a conductive element of the switch closes an open circuit on PCB 12) from a switch-open position (in which the conductive element does not close the open circuit).

Connector unit 92 includes IR emitter output 92A for asserting (in response to control bits asserted by microprocessor 80) target control signals (e.g., for use in generating modulated target control infrared radiation) to the target (the projector or other device to be controlled). The target control signals are used to control the target. Typically the target control signals propagate from IR emitter output 92 to an IR emitter (not shown, but positioned near the target) via a wire pair, modulated target control IR radiation is generated in the IR emitter in response to the target control signals, and the modulated target control IR radiation is transmitted from the IR emitter to the target. Connector unit 92 also includes power terminal 92B and ground terminal 92C, across which a power supply (not shown) applies a suitable DC voltage (e.g., 6 Volts) to power the controller.

In typical embodiments, the target is a projector.

The controller of FIGS. 1 and 3 also includes bezel 4, insert bodies 6, 8, and 10, control keys 22, 26, 28, 32, and 34, and windows 20, 24, and 30.

The assembly comprising bezel 4, insert bodies 6, 8, and 10, control keys 22, 26, 28, 32, and 34, and windows 20, 24, and 30, is removably mounted to back plate 2 with the control keys positioned over switches 60-77 of PCB 12. When the controller is assembled, pressure-sensitive switches 60, 61, and 62 are accessible (by control keys) through the upper row of holes 160 through plate 2, pressure-sensitive switches 63, 64, and 65 are accessible through the lower row of holes 160 through plate 2, pressure-sensitive switches 66-77 are accessible through corresponding holes through plate 2, light can propagate from LEDs 83 through holes 183 through plate 2, light can propagate from LEDs 104 through holes 184 through plate 2, light can propagate from LEDs 85 through holes 185 through plate 2, light can propagate from LEDs 106 and 107 through holes 167 through plate 2, light can propagate from LEDs 88 through corresponding holes through plate 2, and light can propagate from LEDs 109 and 110 through holes 189 through plate 2.

This assembly can be dimensioned so as to have the conventional format known as Decora® format, so that a conventional Decora® style faceplate can be mounted over it. If the inventive assembly is so dimensioned, it can be mounted in an electrical box in which a conventional Decora® style control unit (e.g., a conventional Decora® style light control unit) can be mounted, and the inventive assembly can then covered by a conventional Decora® style faceplate.

Insert body 6 has holes 6A and 6B (sometimes referred to as "slots") for retaining window 20 and control key 22, respectively. Insert body 8 has holes 8A, 8B, and 8C (sometimes referred to as "slots") for retaining window 24, control key 26, and control key 28, respectively. Insert body 10 has holes 10A, 10B, and 10C (sometimes referred to as "slots") for retaining window 30, control key 34, and control key 32, respectively. Inserts comprising bodies 6, 8, and 10, and optionally also keys and/or windows in slots thereof, are modular in the sense that each insert can be used interchangeably with other inserts having similarly sized and shaped insert bodies. For example, insert body 56 (shown in FIGS. 6 and 7) with window 20 and control key 84 retained in slots 56A and 56B extending therethrough can be used in place of insert body 6 (with window 20 and control key 22 retained in slots 6A and 6B). For another example, insert body 58 (shown in FIGS. 6 and 7) with window 24 and control key 86 (retained in slots 58A and 58B extending therethrough) can be used in place of insert body 8 (with window 24 and control keys 26 and 28 retained in slots 8A, 8B, and 8C). For another example, opaque insert body 59 (having no control keys) can be used in place of insert body 10 (with window 30 and control keys 34 and 32 retained in slots 10A, 10B, and 10C).

Control keys 22, 26, 28, 32, and 34 are movable relative to plate 2 (and PCB 12) so that the user can depress the keys against pressure-sensitive switches (mounted on PCB 12) to actuate the switches. The control keys can be rubberized keys or keys of another type. Windows 20, 24, and 30 are fixed relative to plate 2 and PCB 12.

Control key 22 has a first portion (labeled "ON") and a second portion (labeled "OFF"), and can be toggled relative to PCB 12 such that either the first portion can be pressed against switches 60 and 63 (to actuate switches 60 and 63) or the second portion can be pressed against switches 62 and 65 (to actuate switches 62 and 65). Thus, although key 22 is a single key, it functions as two independent keys: one overlying switches 60 and 64 and operable to actuate one or both of switches 60 and 64; the other overlying switches 62 and 65 and operable to actuate one or both of switches 62 and 65. A pair of switches (e.g., 60 and 64, or 62 and 65) can be provided under each end portion of key 22 to ensure that the controller will respond to off-angle key presses by the user (e.g., a key press which actuates only one switch in such pair). It is contemplated that the first portion (labeled "ON") of key 22 will be programmed separately from the second portion (labeled "OFF") of key 22. In a variation on the FIG. 1 embodiment, key 22 is replaced by two separate keys: a POWER ON key overlying switches 60 and 64 and operable to actuate one or both of switches 60 and 64; and a POWER OFF overlying switches 62 and 65 and operable to actuate one or both of switches 62 and 65.

Each of windows 20, 24, and 30 is an element that is at least partially translucent (or transparent) and is marked with a label identifying the function of the key(s) in the insert body in which the window is positioned. Appropriate ones of the windows are backlit by light emitting elements, in a manner to be explained below. For example, window 20 can be marked with the opaque label "Power" to indicate that control key 22 of insert body 6 (or control key 84 of insert body 56) controls assertion of power to the projector (or other device) being controlled, window 24 can be marked with the opaque label "Source" to indicate that control keys 26 and 28 of insert body 8 (or control key 86 of insert body 58) controls the source of data (e.g., display data) to be asserted to the projector (or other device) being controlled, and window 30 can be marked with the opaque label "Volume" to indicate that control keys 32 and 34 of insert body 10 controls the volume of the audio output of the projector (or other device) being controlled.

Figure 2:
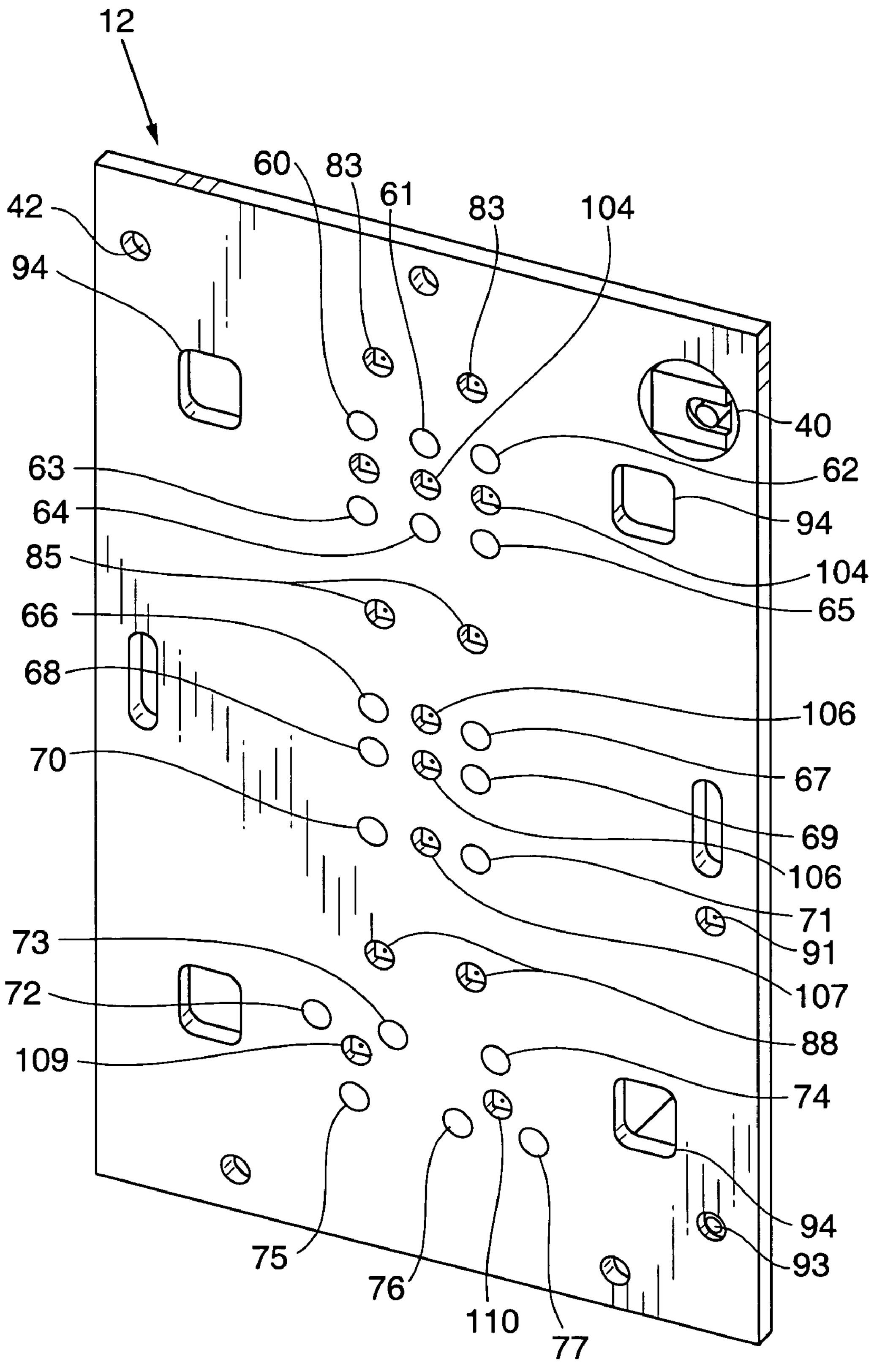
FIG. 2 is a perspective view of the front side of an embodiment of printed circuit board 12 of the FIG. 1 controller.
Figure 3:
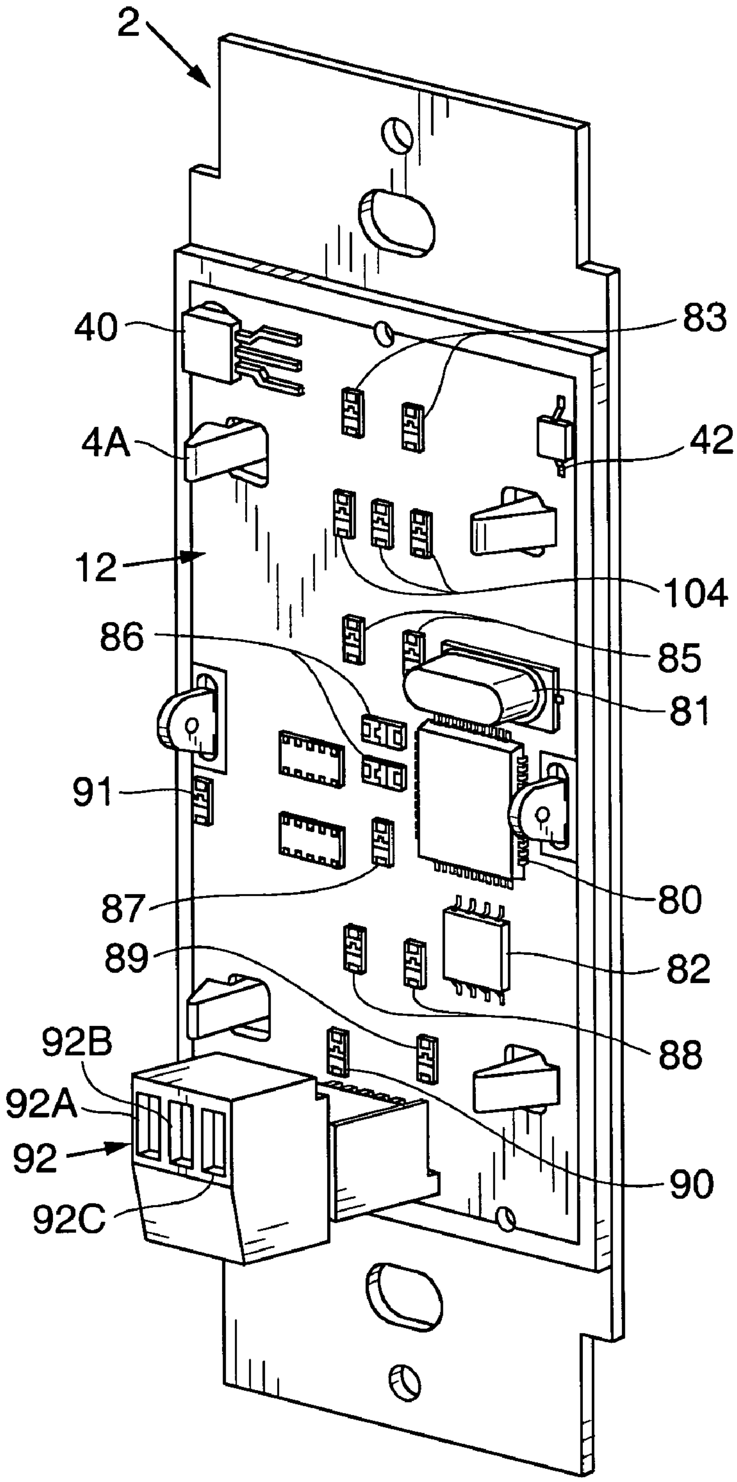
FIG. 3 is a perspective view of the back side of the FIG. 1 controller.
Figure 4:
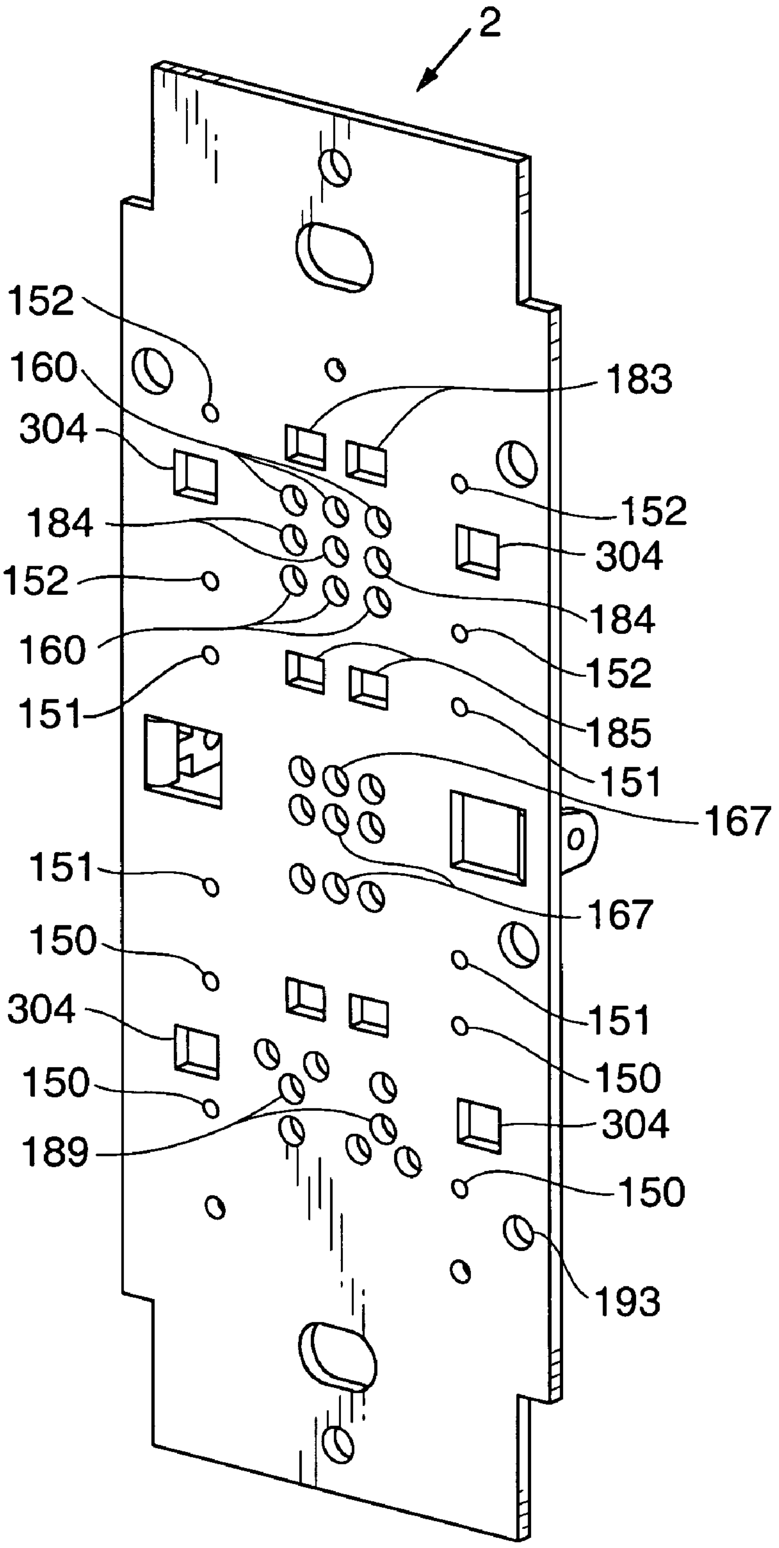
FIG. 4 is a perspective view of metal back plate 2 of the FIG. 1 controller.

To assemble the inventive controller, PCB 12 (whose front face is shown in FIG. 2 and whose back face is shown in FIG. 3) and insulation plate 14 (shown in FIG. 8) are aligned with plate 2, with plate 14 between the front face of PCB 12 and the back surface of plate 2, and holes 94 (extending through PCB 12) aligned with holes 304 (extending through plate 2) and holes 204 (extending through plate 14). Window 20 and control key 22 are placed in holes 6A and 6B, respectively, of insert body 6. Window 24, control key 26, and control key 28 are placed in holes 8A, 8B, and 8C, respectively, of insert body 8. Window 30, control key 34, and control key 32 are placed in holes 10A, 10B, and 10C, respectively, of insert body 10. Insert bodies 6, 8, and 10 (with the control keys positioned in the holes thereof) are then aligned with bezel 4 in positions to be described below, and prongs 4A of bezel 4 are inserted through the aligned holes 94, 304, and 204 of elements 2, 12, and 14, to assemble all elements of the controller together as shown in FIGS. 1 and 3. As prongs 4A of bezel 4 are inserted through the aligned holes 94, 304, and 204, alignment posts 50 of insert body 10 are received by holes 150 (which extend into plate 2) to align insert body 10 with plate 2, alignment posts 51 of insert body 8 are received by holes 151 (which extend into plate 2) to align insert body 8 with plate 2, and alignment posts 52 of insert body 6 are received by holes 152 (which extend into plate 2) to align insert body 6 with plate 2.

When the controller of FIGS. 1-8 has been programmed for use with insert bodies 6, 8, and 10 (and control keys 22, 26, 28, 32, and 34), the controller causes IR emitter 92A to assert a power "on" signal in response to user actuation of switch 60 and/or switch 63 (i.e., when the user toggles key 22 to press the left end of the key, labeled "ON," against switch 60 and/or switch 63, to assert a power "off" signal in response to user actuation of switch 62 and/or switch 65 (i.e., when the user toggles key 22 to press the right end of the key, labeled "OFF," against switch 62 and/or switch 65, to assert a source selection signal that selects a computer as a source in response to user actuation of one or more of switches 66, 67, 70, and 71 (i.e., when the user presses key 26 against one or more of switches 66, 67, 70, and 71), to assert a source selection signal that selects a video source (e.g., DVD player) as a source in response to user actuation of one or both of switches 70 and 71 (i.e., when the user presses key 28 against one or both of switches 70 and 71), to assert a volume decrease signal in response to user actuation of one or more of switches 72, 73, and 75 (i.e., when the user presses key 34 against one or more of switches 72, 73, and 75), and to assert a volume increase signal in response to user actuation of one or more of switches 74, 76, and 77 (i.e., when the user presses key 34 against one or more of switches 74, 76, and 77).

In order to reduce the complexity and manufacturing cost of the controller, all power control keys are positioned in the upper portion of the controller (in front of switches 60, 61, 62, 63, 64, and 65 of PCB 12). Microprocessor 80 (and EEPROM 82) are implemented so that switches 60-65 can be programmed to implement only power control functions (but to implement any of a variety of power control functions) in response to user-actuation of a small number of power control keys (e.g., one power control key such as key 22 that can be toggled between two states to depress either of two distinct subsets of switches 60-65, or one power control key such as key 84 that can be pressed against a single subset of switches 60-65, or two power control keys either of which can be depressed against a different subset of switches 60-65). For example, microprocessor 80 (and EEPROM 82) can be programmed so that the controller causes IR emitter 92A to assert a power "on" signal in response to a first user actuation of a single large key (e.g., key 84 shown in FIG. 7) to depress any of switches 60-65, and to assert a power "off" signal in response to the next user actuation of the same key (key 84) to depress any of switches 60-65, and so on. Thus, the controller can be programmed to implement a number of different power control functions in response to assertion of different ones (or different combinations and/or sequences) of a small number of switches positioned in a power control region (e.g., switches 60-65 positioned in the upper center of PCB 12). Thus, the upper portion of the controller (in front of switches 60, 61, 62, 63, 64, and 65) can be a dedicated power control region, and any of a variety of power control inserts (e.g., an insert including body 6 or 56) all having alignment posts (e.g., posts 52) shaped and positioned to mate with corresponding holes extending through plate 2 (to align the power control insert with plate 2) can be used with the controller. Each such power control insert has a small number of power control keys that are positioned over an appropriate subset of switches 60, 61, 62, 63, 64, and 65 when the power control insert is properly aligned with plate 2 (and retained by bezel 4 in this alignment).

Also to reduce user interface complexity and manufacturing cost of the controller, all source selection keys are positioned in the middle portion of the controller (in front of switches 66, 67, 68, 69, 70, and 71 of PCB 12). Microprocessor 80 (and EEPROM 82) are implemented so that switches 66-71 can be programmed to implement only source selection functions (but to implement any of a variety of source selection functions) in response to user-actuation of a small number of source selection keys (e.g., two keys such as key 26 and 28 that can be pressed against either of two distinct subsets of switches 66-71, or single key such as key 86 that can be pressed against a single subset of switches 66-71). For example, microprocessor 80 (and EEPROM 82) can be programmed so that the controller causes IR emitter 92A to assert a first source selection signal in response to a first user actuation of a single large key (e.g., key 86 shown in FIG. 7) to depress any of switches 66-71, and to assert a second source selection signal in response to the next user actuation of the same key (key 86) to depress any of switches 66-71, and so on. Thus, the controller can be programmed to implement a number of different source selection functions in response to assertion of different ones (or different combinations and/or sequences) of a small number of switches positioned in a source selection region distinct from the above-mentioned power control region (e.g., switches 66-71 positioned in the middle center of PCB 12). Thus, the middle portion of the controller (in front of switches 66, 67, 68, 69, 70, and 71) can be a dedicated source selection region, and any of a variety of source selection inserts (e.g., an insert having body 8 and 58) all having alignment posts (e.g., posts 51) shaped and positioned to mate with corresponding holes extending through plate 2 (to align the source selection insert with plate 2) can be used with the controller. Each such source selection insert has a small number of source selection keys that are positioned over an appropriate subset of switches 66, 67, 68, 69, 70, and 71 when the source selection insert is properly aligned with plate 2 (and retained by bezel 4 in this alignment).

Also to reduce the complexity and manufacturing cost of the controller, all volume control keys are positioned in the lower portion of the controller (in front of switches 72, 73, 74, 75, 76, and 77 of PCB 12). Microprocessor 80 (and EEPROM 82) are implemented so that switches 72-77 can be programmed to implement only volume control functions (but to implement any of a variety of volume control functions) in response to user-actuation of a small number of volume control keys (e.g., two keys such as key 32 and 34 that can be pressed against either of two distinct subsets of switches 72-77, or a single key that can be pressed against a single subset of switches 72-77). Thus, the controller can be programmed to implement a number of different volume control functions in response to assertion of different ones (or different combinations and/or sequences) of a small number of switches positioned in a volume control region distinct from the above-mentioned source selection region and power control region (e.g., switches 72-77 positioned in the lower center of PCB 12). Thus, the lower portion of the controller (in front of switches 72, 73, 74, 75, 76, and 77) can be a dedicated volume control region, and any of a variety of volume control inserts (e.g., an insert having body 10 and 59) all having alignment posts (e.g., posts 50) shaped and positioned to mate with corresponding holes extending through plate 2 (to align the volume control insert with plate 2) can be used with the controller. Each such volume control insert has a small number of volume control keys that are positioned over an appropriate subset of switches 72, 73, 74, 75, 76, and 77 when the volume control insert is properly aligned with plate 2 (and retained by bezel 4 in this alignment).

Preferably, posts 50 have different shape and/or relative spacing than do posts 51, so that the controller cannot be assembled with a volume control insert having posts 50 positioned where a source selection insert having posts 51 should be positioned. Similarly, posts 50 preferably have different shape and/or relative spacing than do posts 52, so that the controller cannot be assembled with a volume control insert having posts 50 positioned where a power control insert having posts 52 should be positioned, and posts 51 preferably have different shape and/or relative spacing than do posts 52, so that the controller cannot be assembled with a source selection insert having posts 51 positioned where a power control insert having posts 52 should be positioned.

Many variations on the above-described embodiment are possible. For example, it is contemplated that some embodiments of the inventive controller have distinct, dedicated volume control, power control, and source selection regions arranged differently relative to each other than in the controller of FIGS. 1-8 (e.g., with a dedicated volume control region between dedicated source selection and power control regions). For another example, other embodiments of the inventive controller have a small number of distinct, dedicated control regions (other than a set of three dedicated volume control, power control, and source selection regions) arranged in predetermined positions relative to each other, each control region having a small number of programmable switches that can be programmed to implement control functions of a different type.

The controller of FIGS. 1-8 is modular (and each of a class of other embodiments of the inventive controller is modular) in the sense that the assembled, programmed controller can be disassembled, one or more of its control inserts exchanged for a control insert of the same type (e.g., a first power control insert exchanged for a different power control insert), and the controller's microprocessor then reprogrammed for use with the replacement control insert (s). The controller of FIGS. 1-8 has $2^3=8$ different configurations, assuming that two different control inserts are available for use with each of its three distinct, dedicated control regions.

Figure 5:
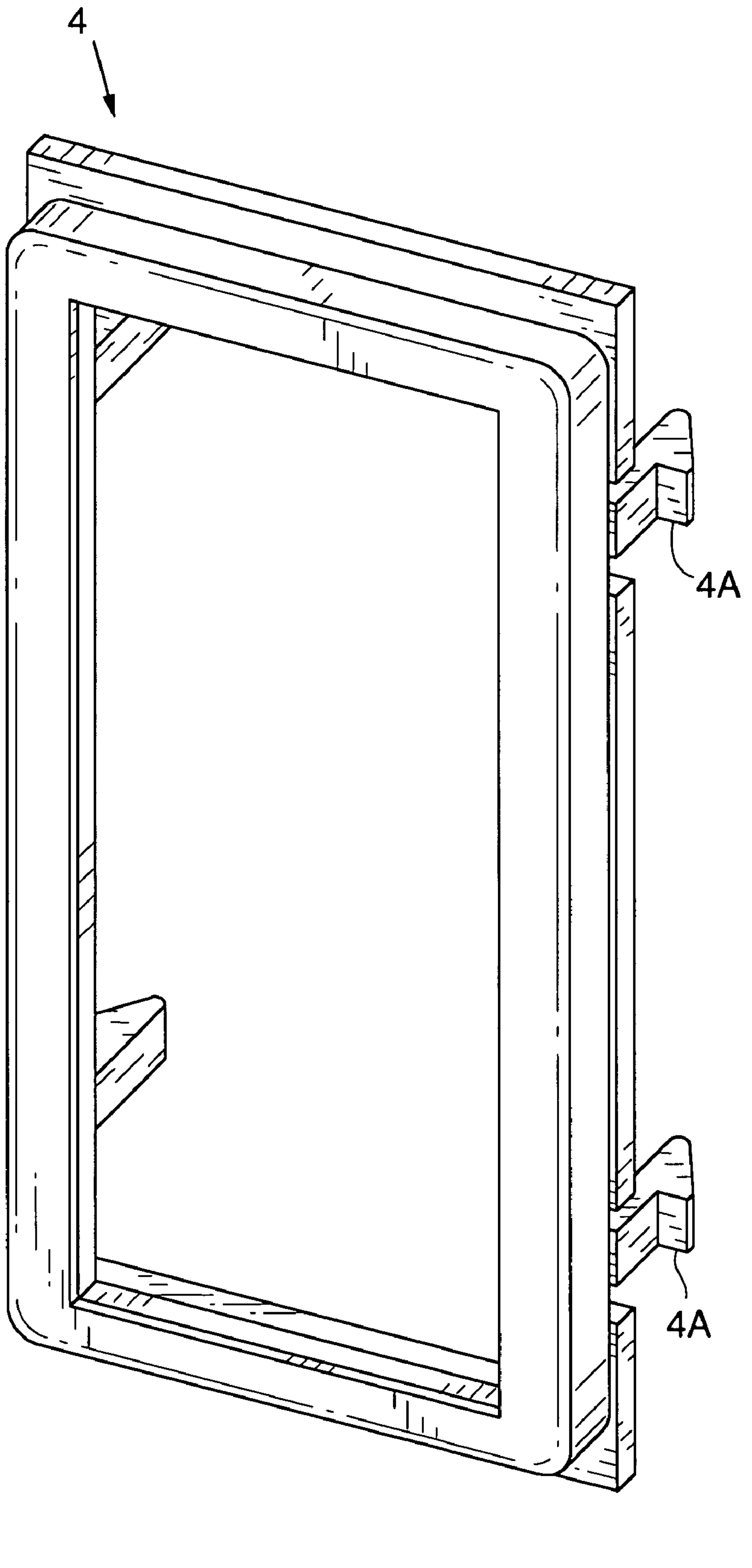
FIG. 5 is a perspective view of bezel 4 of the FIG. 1 controller.

Bezel 4 of the FIG. 1 controller is preferably shaped as shown in FIG. 5 for use with the other elements shown in FIGS. 1-4 and 6-8.

Figure 6:
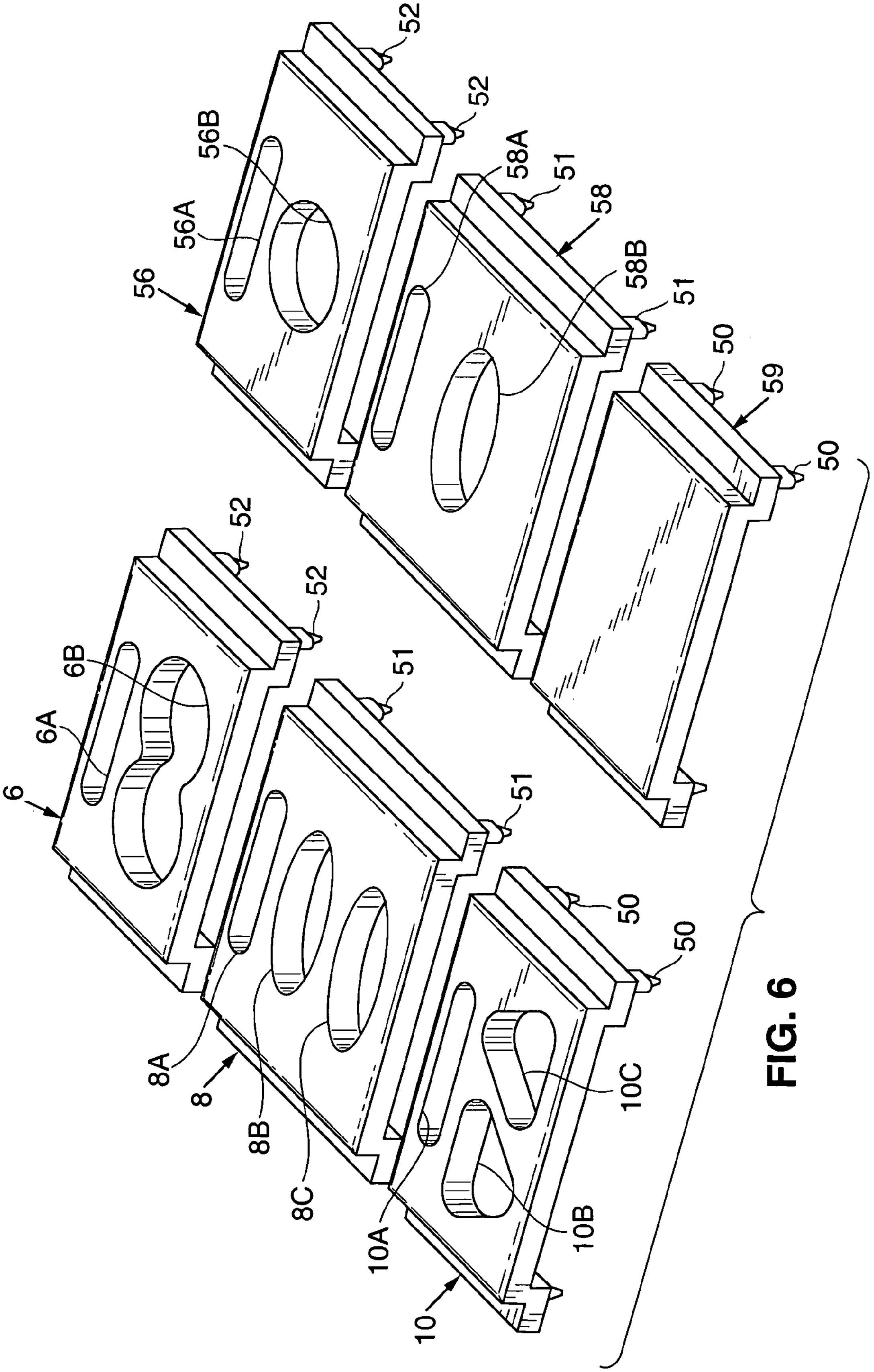
FIG. 6 is a perspective view of a plastic cast (which can be formed by injection molding) which defines two sets of three modular insert bodies: a first set comprising insert bodies 6, 8, and 10; and a second set comprising insert bodies 56, 58, and 59. Each set can be positioned within bezel 4, and the assembly comprising bezel 4 and the set of insert bodies then snapped onto back plate 2 of the FIG. 1 controller.

The bodies of the modular inserts employed in the controller of FIGS. 1-8 can be made of rigid plastic that has been formed in the desired shape by injection molding. FIG. 6 is a perspective view of a plastic cast (which can be formed by injection molding) which defines two sets of three modular insert bodies: a first set comprising insert bodies 6, 8, and 10; and a second set comprising insert bodies 56, 58, and 60. Each set can be positioned within bezel 4, and the assembly comprising bezel 4 and the set of insert bodies then snapped onto back plate 2 of the controller.

Figure 7:
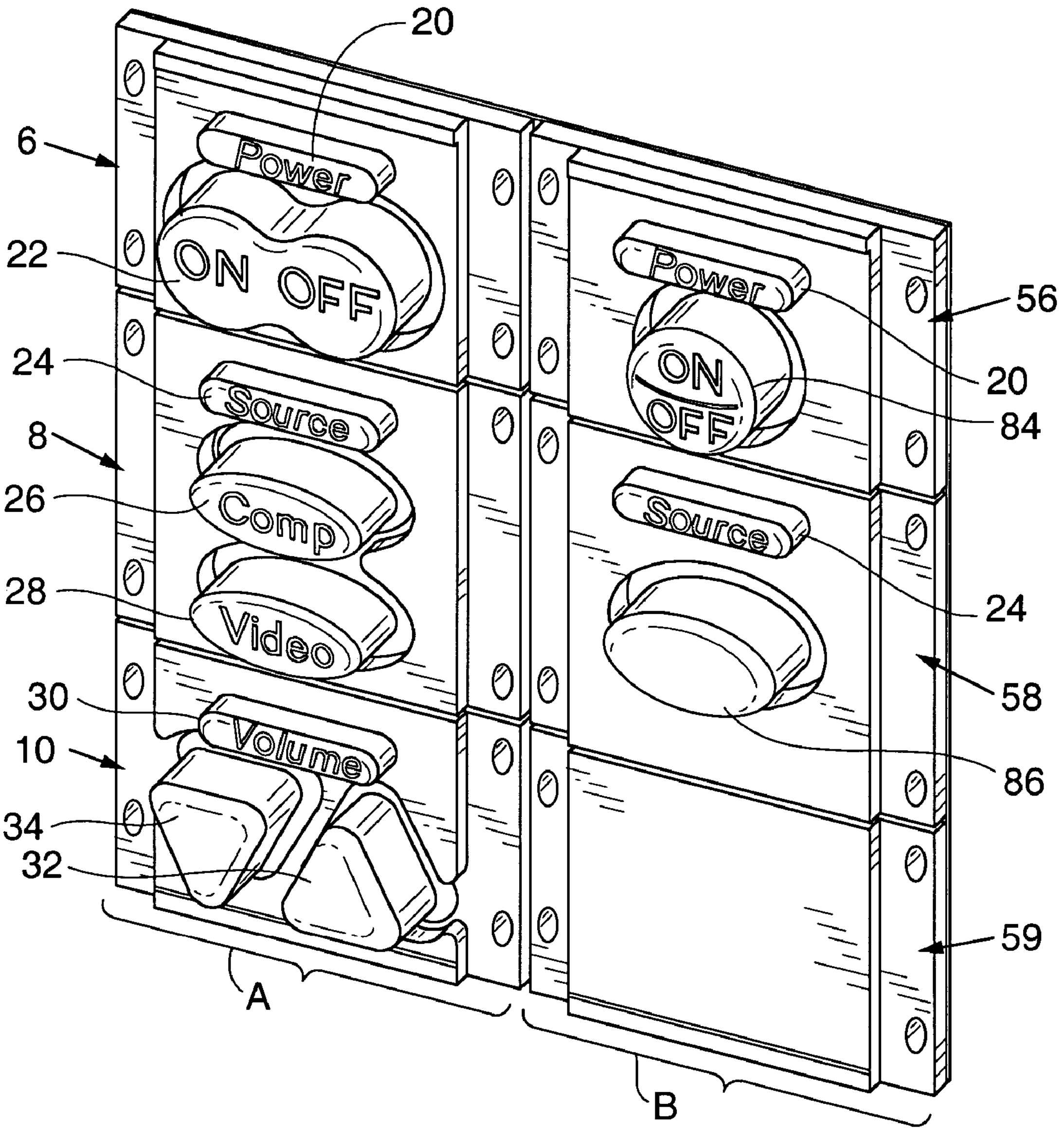
FIG. 7 is a perspective view of two sets of modular inserts, including the insert bodies shown in FIG. 6, and windows and control keys inserted in slots defined by the insert bodies.
Figure 8:
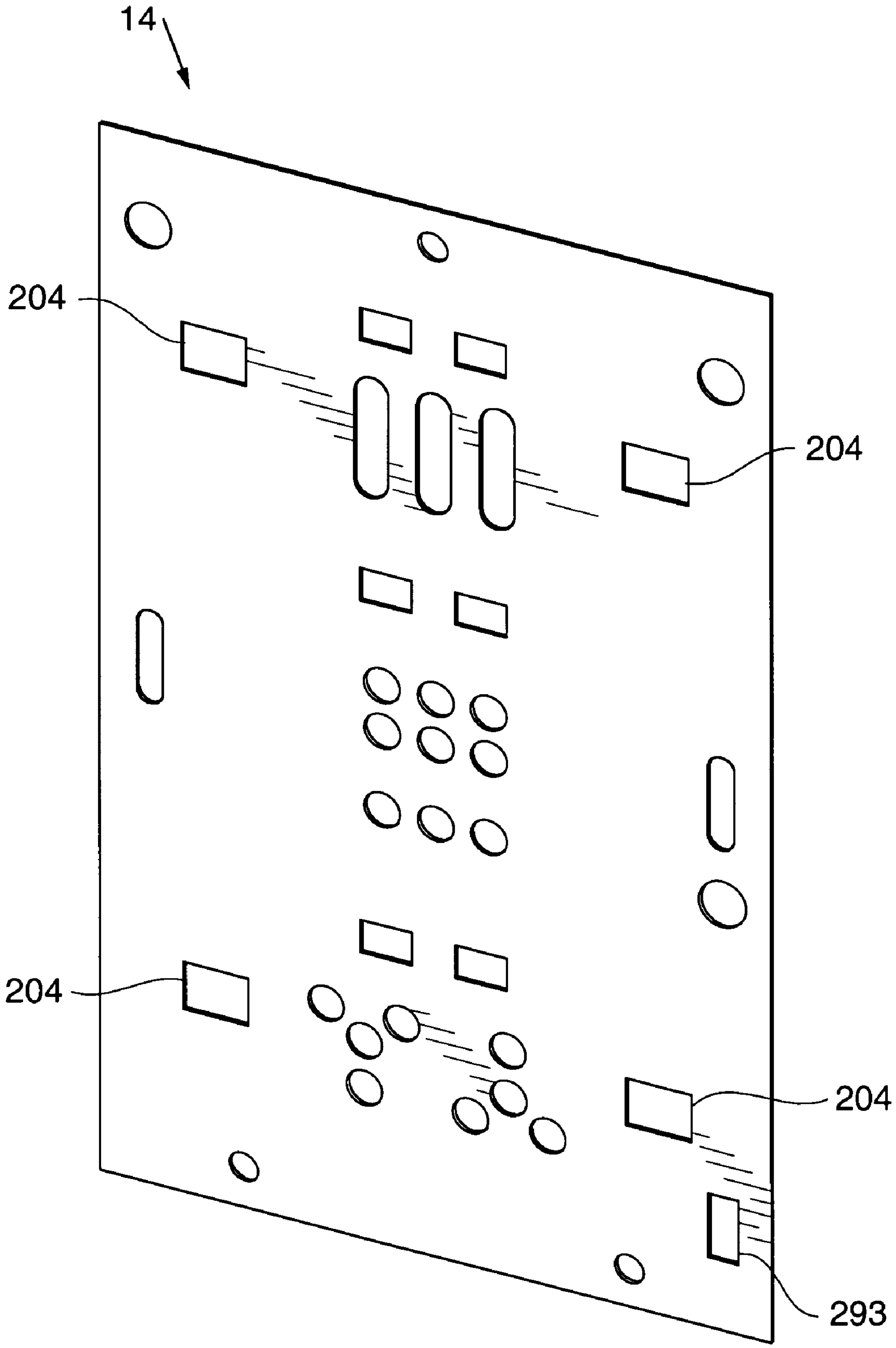
FIG. 8 is a perspective view of insulation plate 14, which can be positioned between printed circuit board 12 and back plate 2 in the controller of FIGS. 1 and 3.

FIG. 7 is a perspective view of the two sets of modular inserts shown in FIG. 6 with windows and control keys inserted in slots defined by the inserts: a first set (labeled "A") consisting of power control insert body 6 (with window 20 and key 22 positioned in slots thereof), source selection insert body 8 (with window 24 and keys 26 and 28 positioned in slots thereof), and volume control insert body 10 (with window 30 and keys 32 and 34 positioned in slots thereof); and a second set (labeled "B") consisting of power control insert body 56 (with window 20 and key 84 positioned in slots thereof), source selection insert body 58 (with window 24 and key 86 positioned in slots thereof), and volume control insert body 59 (having no slots). Insert set A can be used interchangeably with insert set B, provided that microprocessor 80 is programmed for use with the relevant insert set.

Various embodiments of the inventive controller are programmed in a variety of different ways. For example, some embodiments are programmed using conventional techniques for implementing learning modes of conventional remote controllers.

The assembled controller of FIGS. 1 and 3 can be programmed as follows. The user selects the programming mode by actuating programming mode entry switch 93 on PCB 12 for a short time (switch 93 can be actuated using a stylus or other sharp object). Hole 193 through plate 2, hole 293 through insulation plate 14, and switch 93 of the assembled controller are aligned with other so that switch 93 is accessible through aligned holes 193 and 293. Optionally, microprocessor 80 is configured to illuminate programming mode LED 91 while it operates in the programming mode. Once microprocessor 80 has entered the programming mode, a handheld remote controller capable of controlling the target (e.g., a handheld remote controller manufactured for use with the target) is employed to program the inventive controller. The user presses the first control key of the inventive controller to be programmed (e.g., one of keys 22, 26, 28, 32, and 34), points the IR transmitter of the handheld remote controller at IR receiver 40, and operates the handheld remote controller to execute the control operation to be emulated by actuating the first control key. Typically then, control bits indicated by infrared radiation received at IR receiver 40 set bits in EEPROM 82 to configure microprocessor 80 to respond (during normal operation after the inventive controller has been completely programmed) to actuation of the first control key by accessing these bits in EEPROM 82 and causing IR emitter output 92A to assert a control signal indicative of "first key emulating" control bits (control bits that emulate the control bits received from the handheld remote controller). The user then presses the next control key to be programmed (e.g., another one of keys 22, 26, 28, 32, and 34), again points the IR transmitter of the handheld remote controller at IR receiver 40, and operates the handheld remote controller to execute the control operation to be emulated by actuating the next control key. Typically then, control bits indicated by infrared radiation received at IR receiver 40 set bits in EEPROM 82 to configure microprocessor 80 to respond (during normal operation after the inventive controller has been completely programmed) to actuation of the next control key by accessing these bits in EEPROM 82 and causing IR emitter output 92A to assert a control signal indicative of "next key emulating" control bits (control bits that emulate the control bits received from the handheld remote controller during the current programming step). This process is repeated until all keys of the inventive controller have been programmed. The user then actuates programming mode entry switch 93 again to cause the inventive controller to exit the programming mode and resume operation in the normal operating mode.

During programming of each key of the inventive controller, the key is depressed to actuate a corresponding one (or set) of switches 60-77. Infrared radiation indicative of (e.g., modulated with) control bits is then transmitted to receiver 40, and the control bits are in turn asserted from receiver 40 to microprocessor 80. In response, microprocessor 80 and EEPROM 82 are programmed to respond (during normal operation after the inventive controller has been completely programmed) to subsequent actuation of the appropriate one (or set) of switches 60-77 by causing IR emitter output 92A to assert a control signal indicative of the control bits received at receiver 40.

Optionally, a controller (a "first" controller) that embodies the invention is operable in a "cloning" mode after it has been programmed, in which it can copy learned data bits to another controller (a "second" controller, which typically is identical to the first controller) to configure the second controller to emulate the programmed first controller. Such a cloning mode can be implemented as follows. The user selects the cloning mode by actuating the first controller's programming mode entry switch 93 for a time in excess of a predetermined threshold time (e.g., a threshold time equal to 3T, where T is the actuation time of switch 93 sufficient to trigger programming mode operation of the first controller as described above), and actuating the second controller's programming mode entry switch 93 for a short time to cause the second controller to enter its programming mode. The first controller's IR transmitter 42 (shown in FIGS. 1 and 2) is aligned with the second controller's IR receiver 40. With the first and second controllers so aligned, the first controller (in its cloning mode) configures the second controller by transmitting modulated JR radiation (indicative of a sequence of control bits for causing the second controller to emulate the the first controller) from the first controller's JR transmitter 42 to the second controller's JR receiver 40. The second controller responds to this sequence of control bits by configuring its own microprocessor and EEPROM to emulate the microprocessor and EEPROM of the programmed first controller (e.g., by copying the control bits to its EEPROM). A first set of control bits (indicated by infrared radiation received at the second controller's receiver 40) configures the second controller so that the second controller's microprocessor responds to subsequent actuation of a first predetermined one (or set) of the second controller's switches 60-77 by causing the second controller's JR emitter output 92A to assert a control signal indicative of the first set of control bits, then a second set of control bits (indicated by infrared radiation received at the second controller's receiver 40) configures the second controller so that the second controller's microprocessor responds to subsequent actuation of a second predetermined one (or set) of the second controller's switches 60-77 by causing the second controller's JR emitter output 92A to assert a control signal indicative of the second set of control bits, and so on until the second controller is fully configured.

Optionally, the inventive controller is configured to illuminate each of its control keys that has been programmed and is thus available for use. Such illumination allows the user to determine at a glance which control keys have not been programmed and are thus not available for use. For example, when microprocessor 80 (of the controller of FIGS. 1-8) has been programmed to respond to actuation of one or more of switches 60, 61, 62, 63, 64, and 65, microprocessor 80 illuminates at least one (but typically not all) of LEDs (light-emitting diodes) 104. When a transparent or translucent control key (e.g., key 22 or 84) is positioned over the illuminated LEDs 104, a user perceives the key to be illuminated. Similarly, microprocessor 80 illuminates LEDs 106 when microprocessor 80 has been programmed to respond to actuation of corresponding ones of switches 66, 67, 68, and 69 (typically microprocessor 80 is programmed to respond to switches 66 and 68 when insert body 58 is used, or to respond to switches 66, 67, 70, and 71 when insert body 8 is used), microprocessor 80 illuminates LED 107 when microprocessor 80 has been programmed to respond to actuation of corresponding switches 70 and 71, microprocessor 80 illuminates LED 109 when microprocessor 80 has been programmed to respond to actuation of corresponding switches 72, 73, and 75, and microprocessor 80 illuminates LED 110 when microprocessor 80 has been programmed to respond to actuation of corresponding switches 74, 76, and 77. Control keys 22, 26, 28, 84, and 86 (which fit over LEDs 104, 106, and 107) and control keys 32 and 34 (which fit over LEDs 109 and 110) should thus be transparent or translucent (except for function indications marked thereon) so that light from the LEDs can propagate through them to the user.

In a class of embodiments, the inventive controller can easily be disassembled and reassembled in a different configuration (i.e., with a different set of control key inserts). For example, the controller of FIGS. 1-8 is assembled by reversibly snapping together elements 2, 4, 12, and 14 (and control key inserts properly positioned between elements 2 and 4), without the need for screws. The controller of FIGS. 1-8 can be disassembled by squeezing together pairs of prongs 4A (of bezel 4) and then removing prongs 4A from aligned holes 94, 304, and 204 of elements 2, 12, and 14, to decouple elements 2, 4, 12, and 14. After disassembly, a different set of control key inserts can be swapped for the previous control key inserts, and the controller then reassembled with the new set of control key inserts. After the controller is reassembled with a new set of control key inserts, microprocessor 80 typically needs to be reprogrammed.

It should be understood that while some embodiments of the present invention are illustrated and described herein, the invention is defined by the claims and is not to be limited to the specific embodiments described and shown.

What is claimed is:

1. A programmable, wall-mountable controller, for controlling a target operable to receive content from a selected one of at least one source coupled to the target, said controller having a surface, control keys, and a control output, wherein the controller can be programmed to assert at the control output, in response to actuations of the control keys, target control signals for controlling the target, but wherein the controller includes no source input configured to be coupled to any said source, said controller including:

a first key set in a first region of the surface;

a second key set in a second region of the surface, where the second region is distinct from the first region and each of the first key set and the second key set includes at least one of the control keys; and programmable circuitry including switches, wherein the switches include at least one switch that is actuatable in response to actuation of at least one key of the first key set and at least one other switch that is actuatable in response to actuation of at least one key of the second key set, the circuitry is programmed to perform at least one control operation of a first type in response to actuation of a key of the first key set and to perform at least one control operation of a second type in response to actuation of a key of the second key set, the circuitry is not programmed to perform a control operation of the second type in response to actuation of any key of the first key set, and the circuitry is not programmed to perform a control operation of the first type in response to actuation of any key of the second key set.

2. The controller of claim 1, wherein the controller has N control keys, where 2≦N≦8.

3. The controller of claim 2, wherein N=6.

4. The controller of claim 2, wherein N=5.

5. The controller of claim 1, wherein the target is a projector.

6. The controller of claim 1, wherein at least one key of the first key set is labeled to indicate that said key can be actuated to trigger execution of a control operation of the first type, and at least one key of the second key set is labeled to indicate that said key can be actuated to trigger execution of a control operation of the second type.

7. The controller of claim 1, wherein each said control operation of the first type is a power control operation, and each said control operation of the second type is a source selection operation.

8. The controller of claim 1, wherein the circuitry also includes illumination elements, the switches and the illumination elements are mounted under the control keys, and the circuitry is configured to cause the illumination elements to backlight each of the control keys that overlies at least one programmed one of the switches but not to backlight any of the control keys that does not overlie at least one programmed one of the switches.

9. The controller of claim 1, wherein said controller includes an infrared receiver coupled to the circuitry and configured to receive infrared radiation from an external device during programming of said controller to emulate at least one operation of the external device.

10. A programmable, wall-mountable controller having a surface and control keys, said controller including:

a first key set in a first region of the surface;

a second key set in a second region of the surface, where the second region is distinct from the first region and each of the first key set and the second key set includes at least one of the control keys;

a first subassembly including programmable circuitry including switches, wherein the switches include at least one switch that is actuatable in response to actuation of at least one key of the first key set and at least one other switch that is actuatable in response to actuation of at least one key of the second key set, the circuitry is programmed to perform at least one control operation of a first type in response to actuation of a key of the first key set and to perform at least one control operation of a second type in response to actuation of a key of the second key set, the circuitry is not programmed to perform a control operation of the second type in response to actuation of any key of the first key set, and the circuitry is not programmed to perform a control operation of the first type in response to actuation of any key of the second key set;

a control key insert which includes the first key set and is removably mounted to the first subassembly so as to position the first key set in the first region of the surface; and a second control key insert which includes the second key set and is removably mounted to the first subassembly so as to position the second key set in the second region of the surface, wherein the control key insert is configured so as not to be mountable to the first subassembly to position the first key set in the second region of the surface, and the second control key insert is configured so as not to be mountable to the first subassembly to position the second key set in the first region of the surface.

11. The controller of claim 10, wherein the first subassembly includes a plate, the plate defines a first set of alignment holes and a second set of alignment holes, the control key insert has alignment posts configured to fit in the first set of alignment holes when the control key insert is mounted to the first subassembly, the second control key insert has additional alignment posts configured to fit in the second set of alignment holes when the second control key insert is mounted to the first subassembly, and the alignment posts are configured so as not to fit in the second set of alignment holes.

12. A programmable, wall-mountable controller, for controlling a target operable to receive content from a selected one of at least one source coupled to the target, said controller having a surface, N control keys, where 4≦N≦8, and a control output, wherein the controller can be programmed to assert at the control output, in response to actuations of the control keys, target control signals for controlling the target, but wherein the controller includes no source input configured to be coupled to any said source, said controller including:

a first key set in a first region of the surface;

a second key set in a second region of the surface, wherein the second region is distinct from the first region;

a third key set in a third region of the surface, wherein the third region is distinct from each of the first region and the second region, and each of the first key set, the second key set, and the third key set includes at least one of the control keys; and programmable circuitry including a first switch set, a second switch set, and a third switch set, wherein the circuitry is programmed to perform at least one control operation of a first type in response to actuation of at least one switch of the first switch set in response to actuation of at least one key of the first key set, the circuitry is programmed to perform at least one control operation of a second type in response to actuation of at least one switch of the second switch set in response to actuation of at least one key of the second key set, the circuitry is programmed to perform at least one control operation of a third type in response to actuation of at least one switch of the third switch set in response to actuation of at least one key of the third key set, the circuitry is not programmed to perform a control operation of a type other than the first type in response to actuation of any key of the first key set, the circuitry is not programmed to perform a control operation of a type other than the second type in response to actuation of any key of the second key set, and the circuitry is not programmed to perform a control operation of a type other than the third type in response to actuation of any key of the third key set.

13. The controller of claim 12, wherein the target is a projector.

14. The controller of claim 12, wherein 4≦N≦6.

15. The controller of claim 14, wherein N=6.

16. The controller of claim 14, wherein N=5.

17. The controller of claim 14, wherein the target is a projector.

18. The controller of claim 12, wherein the second region is between the first region and the third region.

19. The controller of claim 18, wherein each said control operation of the first type is a power control operation, each said control operation of the second type is a source selection operation, and each said control operation of the third type is a volume control operation.

20. The controller of claim 12, wherein each said control operation of the first type is a power control operation, each said control operation of the second type is a source selection operation, and each said control operation of the third type is a volume control operation.

21. The controller of claim 12, wherein at least one key of the first key set is labeled to indicate that said key can be actuated to trigger execution of a control operation of the first type, at least one key of the second key set is labeled to indicate that said key can be actuated to trigger execution of a control operation of the second type, and at least one key of the third key set is labeled to indicate that said key can be actuated to trigger execution of a control operation of the third type.

22. The controller of claim 12, wherein the circuitry also includes illumination elements, the illumination elements and each switch of the first switch set, the second switch set, the third switch set, are mounted under the control keys, and the circuitry is configured to cause the illumination elements to backlight each of the control keys that overlies at least one programmed switch of the first switch set, the second switch set, and the third switch set, but not to backlight any of the control keys that does not overlie at least one programmed switch.

23. The controller of claim 12, wherein said controller includes an infrared receiver coupled to the circuitry and configured to receive infrared radiation from an external device during programming of said controller to emulate at least one operation of the external device.

24. A programmable, wall-mountable controller having a surface and N control keys, where 4≦N≦8, said controller including:

a first key set in a first region of the surface;

a second key set in a second region of the surface, wherein the second region is distinct from the first region;

a third key set in a third region of the surface, wherein the third region is distinct from each of the first region and the second region, and each of the first key set, the second key set, and the third key set includes at least one of the control keys;

a first subassembly including programmable circuitry including a first switch set, a second switch set, and a third switch set, wherein the circuitry is programmed to perform at least one control operation of a first type in response to actuation of at least one switch of the first switch set in response to actuation of at least one key of the first key set, the circuitry is programmed to perform at least one control operation of a second type in response to actuation of at least one switch of the second switch set in response to actuation of at least one key of the second key set, the circuitry is programmed to perform at least one control operation of a third type in response to actuation of at least one switch of the third switch set in response to actuation of at least one key of the third key set, the circuitry is not programmed to perform a control operation of a type other than the first type in response to actuation of any key of the first key set, the circuitry is not programmed to perform a control operation of a type other than the second type in response to actuation of any key of the second key set, and the circuitry is not programmed to perform a control operation of a type other than the third type in response to actuation of any key of the third key set;

a control key insert which includes the first key set;

a second control key insert which includes the second key set;

a third control key insert which includes the third key set; and a bezel, which aligns and removably mounts the control key insert to the first subassembly with the first key set positioned in the first region of the surface, the second control key insert to the first subassembly with the second key set positioned in the second region of the surface, and the third control key insert to the first subassembly with the third key set positioned in the third region of the surface, wherein the control key insert is configured so as not to be mountable to the first subassembly with the first key set positioned in the second region of the surface, and the control key insert is configured so as not to be mountable to the first subassembly with the first key set positioned in the third region of the surface.

25. The controller of claim 24, wherein the first subassembly includes a plate, the plate defines a first set of alignment holes, a second set of alignment holes, and a third set of alignment holes, the control key insert has alignment posts configured to fit in the first set of alignment holes when the control key insert is mounted to the first subassembly, the second control key insert has a second set of alignment posts configured to fit in the second set of alignment holes when the second control key insert is mounted to the first subassembly, the third control key insert has a third set of alignment posts configured to fit in the third set of alignment holes when the third control key insert is mounted to the first subassembly, the alignment posts are configured so as not to fit in the second set of alignment holes, and the alignment posts are configured so as not to fit in the third set of alignment holes.

* * * * *